US012756973B2

(12) United States Patent
Jung et al.

(10) Patent No.: US 12,756,973 B2
(45) Date of Patent: Oct. 6, 2026

(54) ELECTRONIC DEVICE INCLUDING SOUND DEVICE

(71) Applicant: Samsung Electronics Co., Ltd., Suwon-si (KR)

(72) Inventors: Wonjae Jung, Suwon-si (KR); Seunghwan Lee, Suwon-si (KR); Jiyoon Song, Suwon-si (KR); Jongdoo Kim, Suwon-si (KR); Hanyeop Lee, Suwon-si (KR); Gun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 18/813,467

(22) Filed: Aug. 23, 2024

(65) Prior Publication Data

US 2025/0071478 A1 Feb. 27, 2025

Related U.S. Application Data

(63) Continuation of application No. PCT/KR2024/012531, filed on Aug. 22, 2024.

(30) Foreign Application Priority Data

Aug. 25, 2023 (KR) ........................ 10-2023-0112191
Sep. 22, 2023 (KR) ........................ 10-2023-0127201

(51) Int. Cl.
*H04R 1/34* (2006.01)
*H04R 1/02* (2006.01)

(52) U.S. Cl.
CPC ............. *H04R 1/345* (2013.01); *H04R 1/025* (2013.01); *H04R 1/028* (2013.01); (Continued)

(58) Field of Classification Search
CPC ......... H04R 1/345; H04R 1/025; H04R 1/028
See application file for complete search history.

(56) References Cited

U.S. PATENT DOCUMENTS 10,356,498 B2 7/2019 Yoon et al.
10,547,788 B2 1/2020 Park et al.
(Continued)

FOREIGN PATENT DOCUMENTS

CN 108390967 A 8/2018
CN 108429831 A 8/2018
(Continued)

OTHER PUBLICATIONS

International Search Report dated Nov. 29, 2024, issued in International Application No. PCT/KR2024/012531.

*Primary Examiner* — Olisa Anwah
(74) *Attorney, Agent, or Firm* — Jefferson IP Law, LLP

(57) ABSTRACT

An electronic device is provided. The electronic device includes a display, a housing including an opening for sound output, a camera module including an image sensor, at least one lens, and a barrel for fixing the at least one lens, a sound conduit element surrounding at least a portion of the barrel and including a sound inlet and a sound outlet, a sound element outputting sound through the sound conduit element and the opening, and a bracket on which the camera module and the sound element are mounted, wherein the bracket may include a first conduit that spatially connects a sound output surface of the sound element and the sound inlet, wherein the sound conduit element may include a second conduit that spatially connects the sound inlet and the sound outlet, and wherein the bracket may include a third conduit that spatially connects the sound outlet and the opening of the housing.

20 Claims, 13 Drawing Sheets

(52) U.S. Cl.
CPC ...... *H04R 2400/11* (2013.01); *H04R 2499/11* (2013.01); *H04R 2499/15* (2013.01)

(56) References Cited

U.S. PATENT DOCUMENTS

| | | | | |
|---|---|---|---|---|
| 10,701,469 | B2 | 6/2020 | Park et al. | |
| 10,979,794 | B2 | 4/2021 | Park et al. | |
| 11,483,637 | B2 | 10/2022 | Moon et al. | |
| 11,805,362 | B2 | 10/2023 | Zhang | |
| 11,818,526 | B2 | 11/2023 | Park et al. | |
| 11,917,347 | B2 | 2/2024 | Moon et al. | |
| 12,058,484 | B2 | 8/2024 | Cho et al. | |
| 2017/0245032 | A1* | 8/2017 | Yoon | H04R 1/345 |
| 2018/0059512 | A1* | 3/2018 | Rho | G02B 7/08 |
| 2018/0139389 | A1 | 5/2018 | Park et al. | |
| 2018/0164538 | A1* | 6/2018 | Lee | G03B 7/095 |
| 2019/0320050 | A1* | 10/2019 | Lim | H04R 1/326 |
| 2021/0218866 | A1* | 7/2021 | Moon | G03B 13/36 |
| 2021/0243291 | A1* | 8/2021 | Lim | H04M 1/026 |
| 2021/0250509 | A1* | 8/2021 | Kim | H04N 23/55 |
| 2021/0303036 | A1* | 9/2021 | Kim | H04R 1/028 |
| 2021/0337055 | A1* | 10/2021 | Lee | H04R 1/025 |
| 2022/0124232 | A1* | 4/2022 | Lee | G02B 7/021 |
| 2022/0221771 | A1* | 7/2022 | Hur | G02B 7/08 |
| 2022/0272237 | A1* | 8/2022 | Rho | G02B 27/646 |
| 2022/0312117 | A1 | 9/2022 | Zhang | |
| 2023/0046958 | A1 | 2/2023 | Yun et al. | |
| 2023/0053093 | A1 | 2/2023 | Cho et al. | |
| 2023/0188879 | A1* | 6/2023 | Woo | H05K 1/141<br>381/91 |
| 2024/0121543 | A1 | 4/2024 | Park et al. | |

FOREIGN PATENT DOCUMENTS

| | | | | | |
|---|---|---|---|---|---|
| KR | 10-2006-0126172 | A | | 12/2006 | |
| KR | 10-2017-0098009 | A | | 8/2017 | |
| KR | 10-2018-0051983 | A | | 5/2018 | |
| KR | 10-2018-0053180 | A | | 5/2018 | |
| KR | 10-2021-0003538 | A | | 1/2021 | |
| KR | 20220089353 | A | * | 6/2022 | H04N 23/57 |
| KR | 10-2022-0111530 | A | | 8/2022 | |
| KR | 10-2023-0023234 | A | | 2/2023 | |
| KR | 10-2023-0023449 | A | | 2/2023 | |

* cited by examiner

ELECTRONIC DEVICE INCLUDING SOUND DEVICE

CROSS-REFERENCE TO RELATED APPLICATION(S)

This application is a continuation application, claiming priority under § 365 (c), of an International application No. PCT/KR2024/012531, filed on Aug. 22, 2024, which is based on and claims the benefit of a Korean patent application number 10-2023-0112191, filed on Aug. 25, 2023, in the Korean Intellectual Property Office, and of a Korean patent application number 10-2023-0127201, filed on Sep. 22, 2023, in the Korean Intellectual Property Office, the disclosure of each of which is incorporated by reference herein in its entirety.

BACKGROUND

1. Field

The disclosure relates to an electronic device including a sound device.

2. Description of Related Art

Electronic devices, such as smartphones and tablet personal computers (PCs) may output sound. For example, electronic devices may include a receiver for voice calls. The receiver may output sound of a person on the other end during a voice call. The electronic device may include a sound element (or a sound device) therein, and an opening for sound output (hereinafter referred to as a sound output opening) may be disposed separately from the sound element. A sound conduit through which sound may travel may be formed between the sound element and the sound output opening. Sound generated at the sound element may be transmitted through the sound conduit and emitted through the sound output opening.

On a front surface of the electronic device (a surface where a display is visible), a camera module may be disposed at the center of an upper end. For example, the camera module may be disposed adjacent to the sound output opening and the sound conduit may be disposed to avoid the camera module.

The above information is presented as background information only to assist with an understanding of the disclosure.

SUMMARY

Aspects of the disclosure are to address at least the above-mentioned problems and/or disadvantages and to provide at least the advantages described below. Accordingly, an aspect of the disclosure is to provide an electronic device including a sound device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a housing including an opening for sound output, a camera module including an image sensor, at least one lens, and a barrel for fixing the at least one lens, a sound conduit element surrounding at least a portion of the barrel and including a sound inlet and a sound outlet, a sound element outputting sound through the sound conduit element and the opening, and a bracket on which the camera module and the sound element are mounted, wherein the bracket includes a first conduit that spatially connects a sound output surface of the sound element and the sound inlet, wherein the sound conduit element includes a second conduit that spatially connects the sound inlet and the sound outlet, and wherein the bracket includes a third conduit that spatially connects the sound outlet and the opening of the housing.

In accordance with another aspect of the disclosure, an electronic device is provided. The electronic device includes a display, a housing including an opening for sound output, a camera module including an image sensor, at least one lens, and a barrel for fixing the at least one lens, a sound element configured to output sound, and a bracket on which the camera module and the sound element are mounted, wherein the bracket includes a first conduit that is spatially connected to a sound output surface of the sound element, wherein the camera module includes a second conduit surrounding at least a portion of the barrel and including a sound inlet and a sound outlet, wherein the first conduit is spatially connected to the sound inlet, and wherein the bracket includes a third conduit that spatially connects the sound outlet and the opening of the housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

Figure 1:
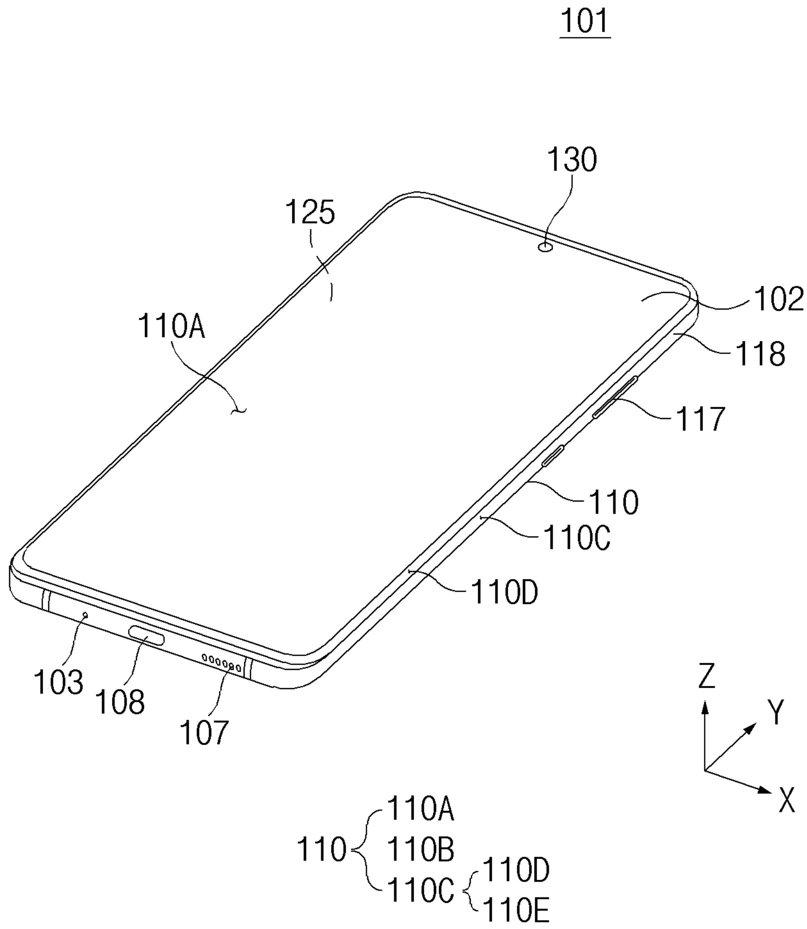
FIG. 1 is a front perspective view of an electronic device according to an embodiment of the disclosure.
Figure 2:
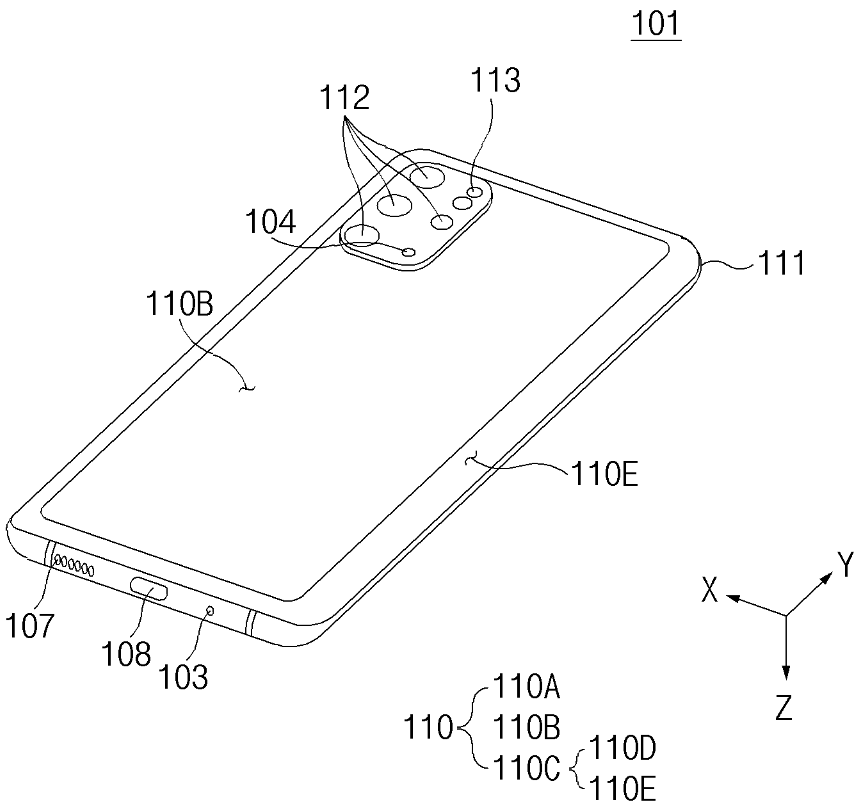
FIG. 2 is a rear perspective view of the electronic device according to an embodiment of the disclosure.

FIG. 1 is a front perspective view of an electronic device according to an embodiment of the disclosure. FIG. 2 is a rear perspective view of the electronic device according to an embodiment of the disclosure.

Referring to FIGS. 1 and 2, an electronic device 101 may include a housing 110 including a first surface (or a front surface) 110A, a second surface (or a back surface) 110B, and a third surface (or a side surface) 110C surrounding a space between the first surface 110A and the second surface 110B. Alternatively, the housing 110 may refer to a structure forming a portion of the first surface 110A, the second surface 110B, and the third surface 110C.

The first surface 110A may be formed by a front plate 102 (e.g., a glass plate or a polymer plate including various coating layers) that is at least partially substantially transparent. The second surface 110B may be formed by a back plate 111. The back plate 111 may be formed, for example, by coated or colored glass, ceramic, polymer, metal (e.g., aluminum, stainless steel (STS), or magnesium), or a combination of at least two of the above materials. The third surface 110C may be coupled with the front plate 102 and the back plate 111, and may be formed by a side member (or a side structure) 118 that includes metal and/or polymer.

In an embodiment of the disclosure, the back plate 111 and the side member 118 may be integrally formed, and may include the same material (e.g., a metal material, such as aluminum).

In the illustrated embodiment of the disclosure, the front plate 102 may include two first regions 110D that extend seamlessly by being bent from a partial region of the first surface 110A toward the side member 118. For example, the first regions 110D may be positioned at both ends of a long edge of the front plate 102.

In the illustrated embodiment of the disclosure, the back plate 111 may include second regions 110E that extend seamlessly by being bent from a partial region of the second surface 110B toward the side member 118. For example, the second regions 110E may be included at both ends of a long edge of the back plate 111.

The side member 118 may form at least a portion of the side surface of the electronic device 101. For example, the side member 118 may be a metal frame.

In an embodiment of the disclosure, when viewed from the side of the electronic device 101, the side member 118 may a first thickness (or width) in an up-and-down lateral direction (e.g., short side), and may have a second thickness that is thinner than the first thickness in a left-right lateral direction (e.g., long side).

The electronic device 101 may include microphone holes 103 and 104 for acquiring sound signals, a speaker hole 107 for outputting sound, camera modules 130, 112, and 113, key input devices 117, and a connector hole 108.

In an embodiment of the disclosure, a display 125 may be visually exposed through the front plate 102. For example, at least a portion of the display 125 may be visually exposed through the front plate 102 including the first surface 110A and the first regions 110D. The display 125 may be disposed below the front plate 102 (a z− direction).

In an embodiment of the disclosure, the surface of the housing 110 (or the front plate 102) may include a screen display region formed as the display 125 is visually exposed. For example, the screen display region may include the first surface 110A and the first region 110D of the side surface.

In an embodiment of the disclosure, the display 125 may include a region through which a camera module 130 (e.g., a punch hole camera) may be visually exposed. For example, in a region where the camera module 130 is visually exposed, at least a portion of its edge may be surrounded by the screen display region.

In an embodiment (not illustrated), the display 125 may be coupled to or disposed adjacent to a touch sensing circuit, a pressure sensor capable of measuring the intensity (pressure) of the touch, and/or a digitizer detecting a magnetic field type stylus pen.

According to an embodiment of the disclosure, the display 125 and the front plate 102 may be integrally implemented. The front plate 102 may be a glass panel or a window panel for protecting the display 125.

In an embodiment of the disclosure, the camera modules 130, 112, and 113 may include a first camera module (or a front camera) 130 (e.g., a punch hole camera) exposed through the first surface 110A of the electronic device 101, and a camera module (or a rear camera) 112 and/or a flash 113 exposed through the second surface 110B.

In an embodiment of the disclosure, the camera module 130 may be visually exposed through a portion of the screen display region of the display 125. For example, the first camera module 130 may be visually exposed through an opening (not illustrated) formed in a portion of the display 125 in a partial region of the screen display region.

In an embodiment of the disclosure, the camera module 112 may include a plurality of cameras (e.g., a dual camera, a triple camera, or a quad camera). However, the camera module 112 is not necessarily limited to including a plurality of cameras, and may include a single camera.

Each of the camera modules 130, 112, and 113 may include one or more lenses, an image sensor, and/or an image signal processor. The flash 113 may include, for example, a light emitting diode or a xenon lamp. In an embodiment of the disclosure, two or more lenses (infrared camera, wide-angle and telephoto lenses) and image sensors may be disposed on one surface of the electronic device 101.

In an embodiment of the disclosure, the key input devices 117 may be disposed on the third surface 110C of the housing 110 (e.g., the first regions 110D and/or the second regions 110E). In an embodiment of the disclosure, the electronic device 101 may not include some or all of the key input devices 117, and the key input device(s) 117 that is (are) not included may be implemented in other forms, such as a soft key, on the display 125. In an embodiment of the disclosure, the key input device may include a sensor module (not illustrated) forming the sensing region (not illustrated) included in the screen display regions 110A and 110D.

In an embodiment of the disclosure, the connector hole 108 may accommodate a connector. The connector hole 108 may be disposed in the third surface 110C of the housing 110. For example, the connector hole 108 may be disposed in the third surface 110C to be adjacent to at least a portion of the audio module (e.g., the microphone hole 103 and the speaker hole 107). In an embodiment of the disclosure, the electronic device 101 may include a first connector hole 108 capable of accommodating a connector (e.g., a USB connector) for transmitting and receiving electric power and/or data to and from an external electronic device, and/or a second connector hole (not illustrated) capable of accommodating a connector (e.g., an earphone jack) for transmitting and receiving audio signals to and from an external electronic device.

According to an embodiment of the disclosure, the electronic device 101 may include a sound output opening for calls. The sound output opening may be formed by a separation space between the front plate 102 and the side member 118 (see FIG. 3).

Figure 3:
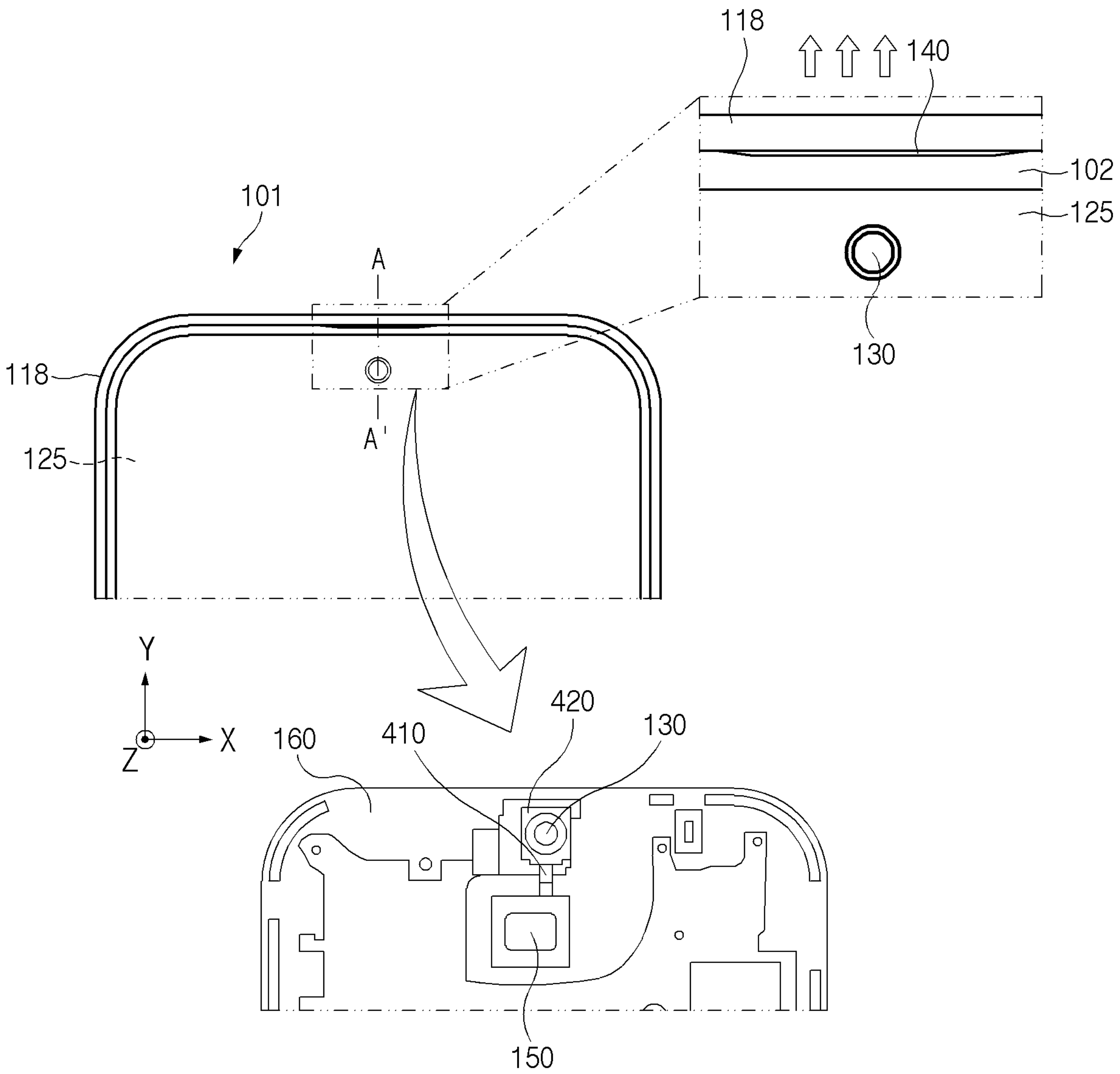
FIG. 3 shows a sound output opening and a sound conduit according to an embodiment of the disclosure.

FIG. 3 shows the sound output opening and the sound conduit according to an embodiment of the disclosure.

Referring to FIG. 3, the electronic device 101 may include the front plate 102, the side member 118, the camera module 130, and a sound output opening 140. FIG. 3 is a view mainly illustrating a configuration related to sound output; however, the disclosure is not limited thereto.

The front plate 102 may cover the first surface (front surface) of the electronic device 101. The front plate 102 may protect the display 125 and the camera module 130. The front plate 102 may be a glass panel. The front plate 102 may be collectively referred to as a display module together with the display 125.

The side member 118 may form the side surface of the electronic device 101. The side member 118 may form a border that contacts the front plate 102 at least in part. For example, the side member 118 may be a metal frame that forms the side surface of the electronic device 101.

The camera module (or camera, camera device) 130 may capture images. The camera module 130 may be a front camera disposed in the same direction as the display 125. For example, the camera module 130 may be implemented in a hole-in-display (HID) form that is exposed to the outside through a hole formed in the display 125. When the electronic device 101 is viewed from the front, the camera module 130 may be disposed at the center of an upper portion of the electronic device 101.

The sound output opening 140 may be formed between the front plate 102 and the side member 118. The sound output opening 140 may be formed in a space at a boundary adjacent to the camera module 130 among boundaries between the front plate 102 and the side member 118. For example, the sound output opening 140 may be formed in a recess shape in the side member 118 or the front plate 102. The sound output opening 140 may be formed to be thin along the boundary between the front plate 102 and the side member 118, and may not be clearly visible from the outside. The sound output opening 140 may emit sound output from a sound element (or a sound device) 150 (e.g., a receiver for calls) inside the electronic device 101 to the outside.

According to an embodiment of the disclosure, the sound output opening 140 may be formed as a through-hole in the side member 118.

According to an embodiment of the disclosure, the sound output opening 140 may be covered with a cover made of mesh material. In this way, foreign substances flowing in from the outside may be blocked or reduced.

According to an embodiment of the disclosure, the camera module 130 and the sound output opening 140 may be aligned along a virtual center line A-A' in a vertical direction of the electronic device 101. For example, the center of the lens of the camera module 130 and the center of the sound output opening 140 may be disposed on the center line A-A'.

According to various embodiments of the disclosure, the electronic device 101 may include a bracket 160 therein. The bracket 160 may be coupled or fixed to the side member 118. On the bracket 160, various elements may be mounted (disposed). For example, the bracket 160 may be assembled with the camera module 130 and the sound element 150.

According to an embodiment of the disclosure, the bracket 160 may include a hole (hereinafter referred to as a camera hole) through which a portion of the camera module 130 passes (see FIGS. 8 and 9). The camera module 130 may be fixed with a portion of a lens section (or a barrel) inserted into the camera hole of the bracket 160 so that at least one lens faces the front surface of the electronic device 101.

According to an embodiment of the disclosure, the bracket 160 may include a sound element seating portion on which the sound element 150 is mounted. The sound element 150 may be fixed to the sound element seating portion (see FIGS. 8 and 9). The sound generated from the sound element 150 may be emitted to the outside through a first conduit 410, a second conduit 420, a third conduit (not illustrated, 430 in FIG. 4), and the sound output opening 140. When viewed from the front of the electronic device 101 (viewed from a z+ direction), the second conduit 420 may be disposed to overlap or be stacked with the camera module 130. The first conduit 410 may spatially connect a space around a sound generating surface of the sound element 150 and a sound inlet of the second conduit 420. The third conduit (not illustrated, 430 in FIG. 4) may connect a sound outlet of the second conduit 420 and the sound output opening 140.

According to an embodiment of the disclosure, the first conduit 410, the second conduit 420, and the third conduit (not illustrated, 430 in FIG. 4) may be disposed along the virtual center line A-A' in the vertical direction of the electronic device 101. In this way, the sound conduit for transmitting the sound generated from the sound element 150 does not bypass the camera module 130 and is transmitted over a relatively short distance, so that the sound may not be deflected to the left or right and the loss of the sound may be small.

According to an embodiment of the disclosure, the center of the first conduit 410 and the center of the third conduit (not illustrated, 430 in FIG. 4) may be disposed on the virtual center line A-A' in the vertical direction of the electronic device 101.

Additional information regarding the first conduit 410, the second conduit 420, and the third conduit (not illustrated, 430 in FIG. 4) may be provided through the drawings below.

Figure 4:
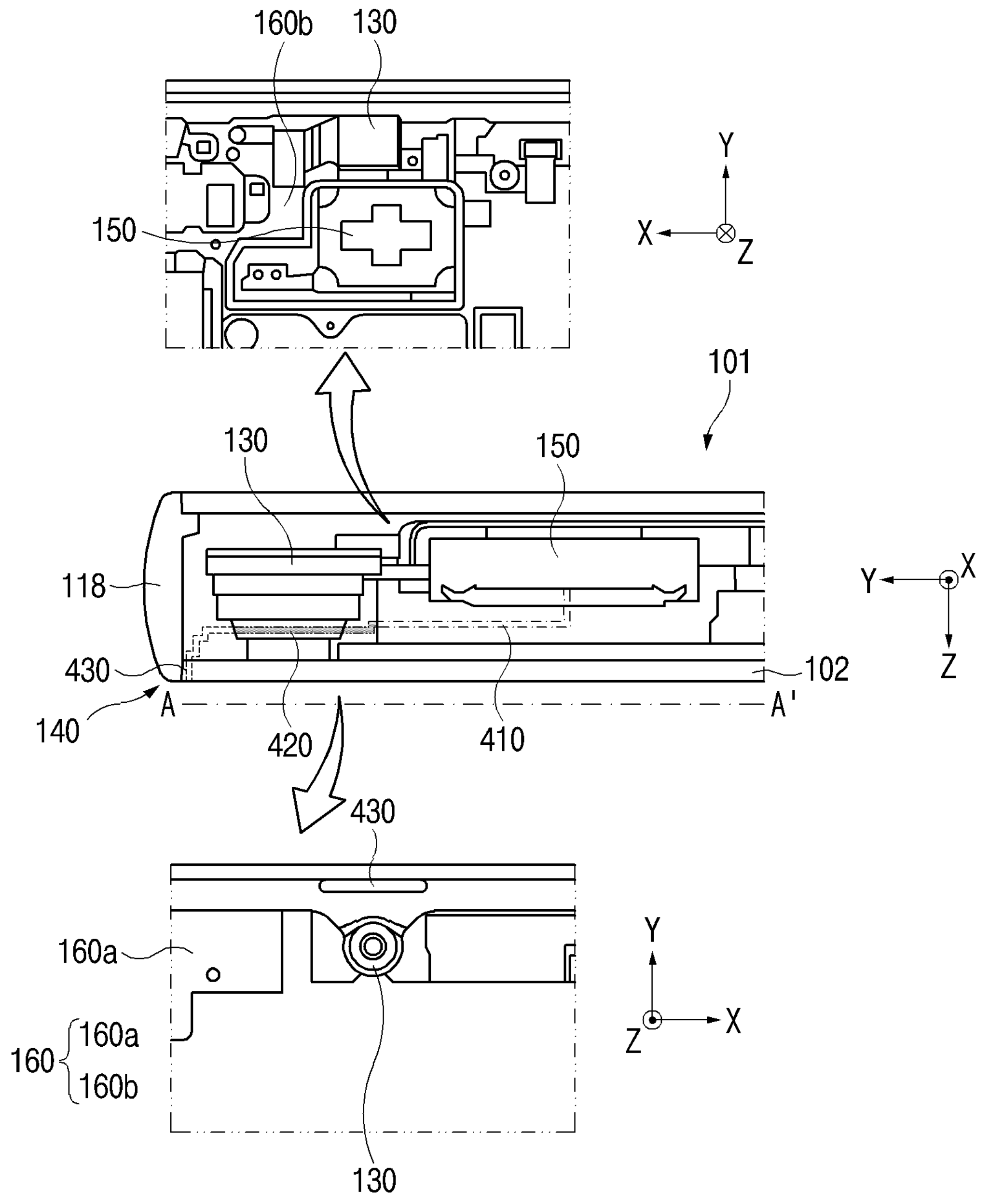
FIG. 4 is a diagram illustrating a cross-sectional view and an internal configuration of the electronic device according to an embodiment of the disclosure.

FIG. 4 is a diagram illustrating a cross-sectional view and an internal configuration of the electronic device according to an embodiment of the disclosure. The cross-sectional view of FIG. 4 may be taken along line A-A' in FIG. 3.

Referring to FIG. 4, the electronic device 101 may include the camera module 130, the sound element 150, and the bracket 160.

The lens of the camera module 130 may be disposed to face the front plate 102. The camera module 130 may be disposed adjacent to side member 118. The camera module 130 may be mounted on a second surface **160*b* of the bracket 160, and a portion of the lens section or barrel (or the lens holder) may protrude toward a first surface 160*a* of the bracket 160 through a camera opening. The camera module may be disposed to overlap or be stacked with the second conduit 420 (or a sound conduit element including the second conduit 420, see FIGS. 5 and 6**).

The sound element 150 may be fixed to the second surface **160*b* of the bracket 160. The sound element 150 may be a receiver for calls. A sound output surface of the sound element 150 may be disposed to face a sound passing hole formed in the bracket 160. The first conduit 410 may be formed through a partial region of the first surface 160*a* of the bracket 160 around the sound element 150 and a separate plate (see FIG. 8**).

The bracket 160 may fix the camera module 130 and the sound element 150. The bracket 160 may include the camera opening. A portion of the lens section (or the barrel) of the camera module 130 may protrude in a direction toward the front plate 102 through the camera opening. In addition, the bracket 160 may include the sound element seating portion. The sound output surface of the sound element 150 may be disposed to face the sound element seating portion (see FIGS. 8 and 9).

According to an embodiment of the disclosure, the sound (e.g., call voice) output from the sound element 150 may be emitted to the sound output opening 140 through the first conduit 410, the second conduit 420, and the third conduit 430.

The first conduit 410 may spatially connect a space around the sound output surface and the sound inlet of the second conduit 420. Additional information regarding the first conduit 410 may be provided through FIG. 8.

The second conduit 420 may be disposed to overlap or be stacked with the camera module 130 in a Z-axis direction. The second conduit 420 may be formed around the lens or barrel of the camera module 130. For example, the second conduit 420 may be formed by the sound conduit element disposed in a shape that surrounds the lens or barrel. Additional information regarding the second conduit 420 may be provided through FIGS. 5 and 6.

The third conduit 430 may spatially connect the sound outlet of the second conduit 420 and the sound output opening 140. The third conduit 430 may be formed inside the bracket 160, and may be disposed so that a sound emission hole faces the sound output opening 140. Additional information regarding the third conduit 430 may be provided through FIG. 10.

Figure 5:
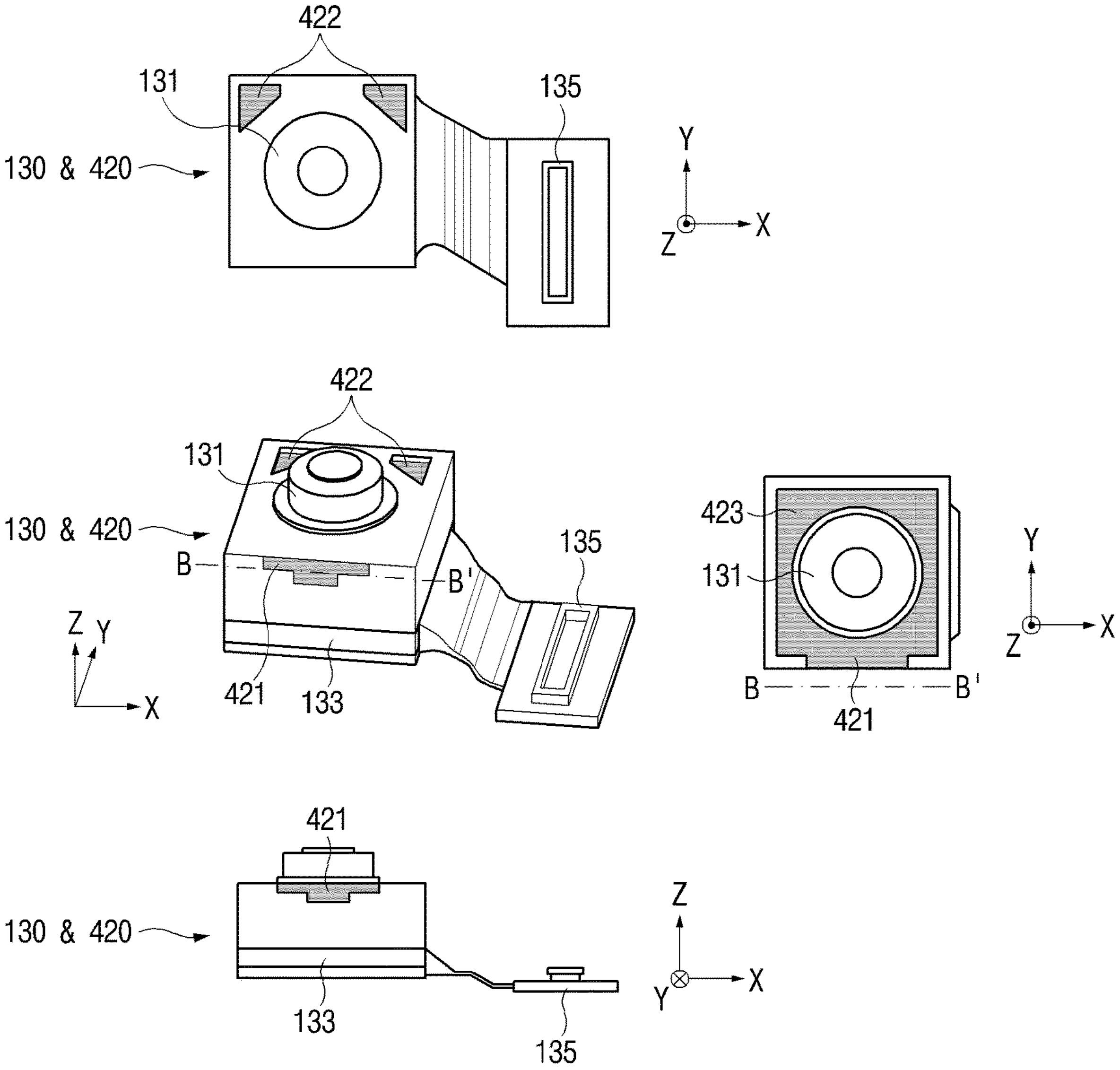
FIG. 5 shows a second conduit according to an embodiment of the disclosure.

FIG. 5 shows the second conduit according to an embodiment of the disclosure.

Referring to FIGS. 4 and 5, when viewed in a first direction (front) where at least one lens included in the camera module 130 faces, the camera module 130 may be disposed to overlap or be stacked with the second conduit 420. The second conduit 420 may have a shape that surrounds at least a portion of the lens section (or the barrel) 131 of the camera module 130. The element including the second conduit 420 (hereinafter referred to as the sound conduit element) (see FIG. 6) may be stacked on top of the camera module 130. The camera module 130 may be electrically connected to the inside of the electronic device 101 through a connector 135.

The second conduit 420 may include a sound inlet 421, a sound outlet 422, and a connecting passage 423. The sound inlet 421 may be connected to the first conduit 410. The sound inlet 421 may be formed on a side surface of the camera module 130 (a side surface facing the first conduit 410). The sound outlet 422 may be connected to the third conduit 430. The sound outlet 422 may be formed on a front surface of the camera module 130 (a surface that the lens faces).

Referring to FIG. 5, a case in which the sound outlet 422 is formed of a plurality of openings is illustrated, but the sound outlet 422 is not limited thereto. For example, the sound outlet 422 may be formed of one opening. In addition, FIG. 5 illustrates a case in which the sound outlet 422 is implemented in a triangular shape, but the sound outlet 422 is not limited thereto. The sound outlet 422 may be implemented in various shapes, such as a square or circular shape.

The connecting passage 423 may spatially connect the sound inlet 421 and the sound outlet 422. The connecting passage 423 may have a shape that surrounds the circular lens section (or the barrel) 131. When a base of the camera module 130 has a square shape, an inner line of the connecting passage 423 may have a circular shape, and an outer line of the connecting passage 423 may have the same square shape as the base of the camera module 130.

Figure 6:
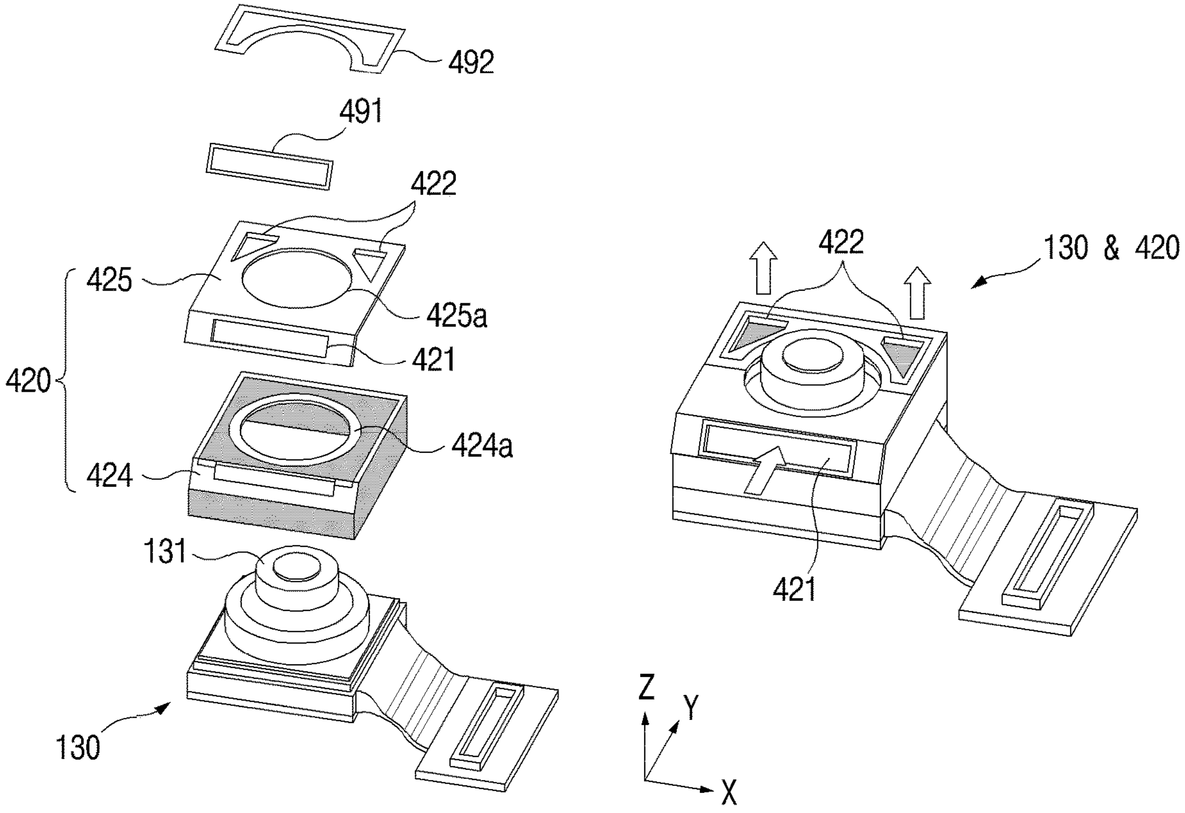
FIG. 6 shows a combination of a camera module and a sound conduit element including the second conduit according to an embodiment of the disclosure.

FIG. 6 shows a combination of the camera module and a sound conduit element including the second conduit according to an embodiment of the disclosure.

Referring to FIG. 6, when viewed in the first direction (front) where the lens faces, a sound conduit element 4201 may be disposed to overlap or be stacked with the camera module 130.

The sound conduit element 4201 may include a base housing 424 and a cover housing 425. The shapes of the base housing 424 and the cover housing 425 in FIG. 6 are illustrative and are not limited thereto.

The base housing 424 may include a first through-hole 424*a* through which the lens section (or the barrel) 131 passes. The base housing 424 may be coupled to an upper surface (a surface on which the lens section (or the barrel) 131 protrudes) of the camera module 130. At least a portion of the lens section (or the barrel) 131 of the camera module 130 may pass through the first through-hole 424*a*.

The cover housing 425 may include a second through-hole 425*a* through which the barrel of the lens passes, the sound inlet 421, and the sound outlet 422. The second through-hole 425*a* may be disposed to coincide with the first through-hole 424*a*. At least a portion of the lens section (or the barrel) 131 of the camera module 130 may pass through the second through-hole 425*a*.

According to an embodiment of the disclosure, the sound inlet 421 may be blocked from the surroundings by a first sealing member 491. The sound outlet 422 may be blocked from the surroundings by a second sealing member 492. The first sealing member 491 and the second sealing member 492 may be waterproof tapes.

Figure 7:
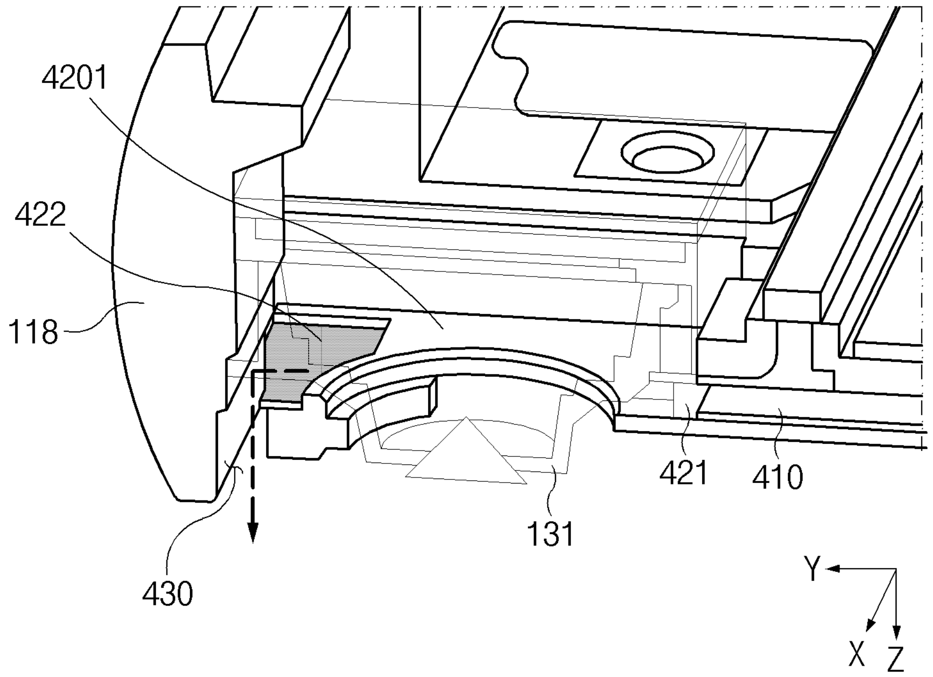
FIG. 7 shows a formation of the second conduit and a third conduit around the camera module according to an embodiment of the disclosure.

FIG. 7 shows a formation of the second conduit and the third conduit around the camera module according to an embodiment of the disclosure.

Referring to FIGS. 5 to 7, when viewed in the first direction (front) where at least one lens included in the lens section 131 faces, the camera module 130 may be disposed to overlap or be stacked with the sound conduit element 4201 including the second conduit 420.

The second conduit 420 may be formed around the lens section 131. At least a portion of the lens section 131 may pass through the sound conduit element 4201 in which the second conduit 420 is formed.

The second conduit 420 may include the sound inlet 421 and the sound outlet 422. The sound inlet 421 may be connected to the first conduit 410. The sound outlet 422 may be connected to the third conduit 430.

Figure 8:
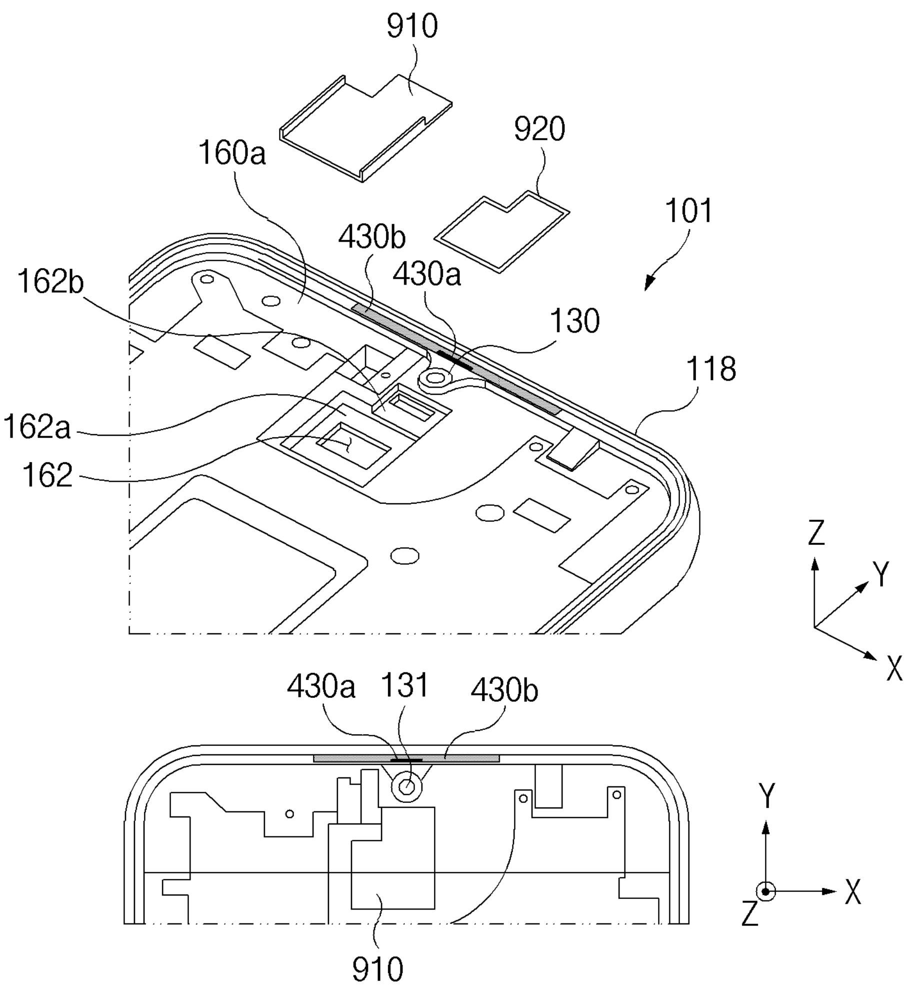
FIGS. 8 and 9 show a bracket according to various embodiments of the disclosure.

According to an embodiment of the disclosure, the first conduit 410 may be formed through a portion of the bracket 160 and a separate plate (see FIG. 8). The third conduit 430 may be formed inside the bracket 160, and may be disposed so that the sound emission hole faces the front surface of the electronic device 101 (see FIG. 10).

Through the structure in which the camera module 130 and the sound conduit element 4201 are stacked, the second conduit 420 may not be disposed to avoid the entire camera module 130, but may be disposed to avoid only the lens section 131 of the camera module 130. In addition, the second conduit 420 may be formed above the base of the camera module 130. In this way, the sound conduit for transmitting the sound generated from the sound element 150 does not bypass the camera module 130 and is transmitted over a relatively short distance, so that the sound may not be deflected to the left or right and the loss of the sound may be small.

According to an embodiment of the disclosure, the sound element 150 or the camera module 130 may be configured so as not to affect each other. The sound conduit element 4201 is coupled and fixed to the camera module 130, so that the second conduit 420 may affect the operation of the camera module 130. For example, the second conduit 420 may be used when a user places the electronic device 101 to his or her ear and makes a voice call, and in this case, the operation of the camera module 130 may be restricted. For another example, when the camera module 130 performs fixed focus (FF) or auto focus (AF), the operation of the sound element 150 may be restricted. In this way, movement of sound may not occur in the sound conduit element 4201, or vibration may not occur by the sound conduit element 4201.

Figure 9:
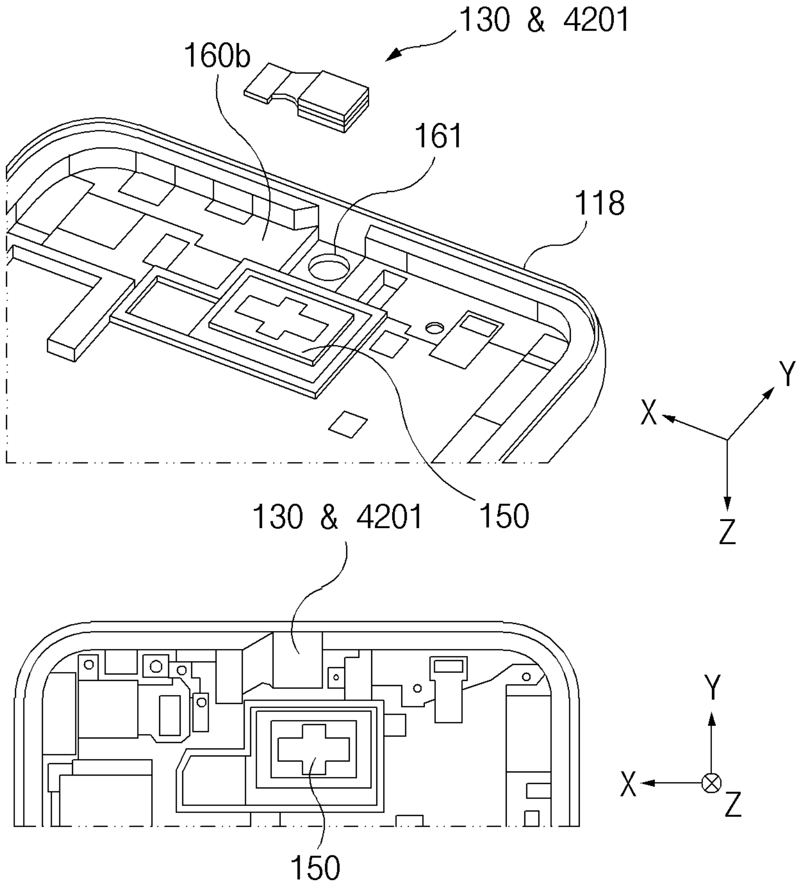

FIGS. 8 and 9 show the bracket according to various embodiments of the disclosure.

Referring to FIGS. 4, 8, and 9, the electronic device 101 may include the camera module 130, the sound element 150, and the bracket 160 therein. The camera module 130 and the sound element 150 may be coupled or fixed to the bracket 160.

According to an embodiment of the disclosure, the bracket 160 may include the first surface 160*a* of the electronic device 101 facing the first direction (front) and the second surface 160*b* of the electronic device 101 facing a second direction (rear). The bracket 160 may include a camera hole 161 and a sound passage hole 162. The camera hole 161 may be disposed between the sound passage hole 162 and the side member 118.

The sound element 150 may be coupled to the second surface 160*b* of the bracket 160. The sound element seating portion surrounding the sound passage hole 162 may be formed on the second surface 160*b* of the bracket 160. The sound element 150 may be coupled to the sound element seating portion so that the sound output surface faces the sound passage hole 162.

When viewed from the first surface 160*a* of the bracket 160, the sound output surface may be exposed through the sound passage hole 162. The sound generated from the sound output surface may be transmitted to the sound inlet 421 of the second conduit 420 through the first conduit 410.

The first conduit 410 may be formed by at least a portion of the first surface 160*a* of the bracket 160 and a plate 910. The plate 910 may cover a seating portion corresponding region 162*a* around the sound passage hole 162 and a bracket region 162*b* connected from the seating portion corresponding region 162*a* to the sound conduit element 4201. A third sealing member 920 may be disposed between the plate 910 and the bracket 160 to block or reduce foreign substances (e.g., moisture and dust) flowing in from the outside.

The sound conduit element 4201 and the camera module 130 may be coupled on the second surface 160*b* of the bracket 160. The sound conduit element 4201 may be disposed between the camera module 130 and the second surface 160*b* of the bracket 1620.

The lens section (or the barrel) 131 of the camera module 130 may be exposed to the first surface 160*a* through the camera hole 161. The sound conduit element 4201 may not be visible from the first surface 160*a* of the bracket 160.

According to an embodiment of the disclosure, a sound emission hole 430*a* of the third conduit 430 may be formed on the first surface 160*a* of the bracket 160. The sound emitted through the sound emission hole 430*a* may be emitted to the outside of the electronic device 101 through the sound output opening 140. The sound emission hole 430*a* may be disposed between the side member 118 and the camera module 130. A region 430*b* that spreads sound throughout the sound output opening 140 may be disposed around the sound emission hole 430*a*.

Figure 10:
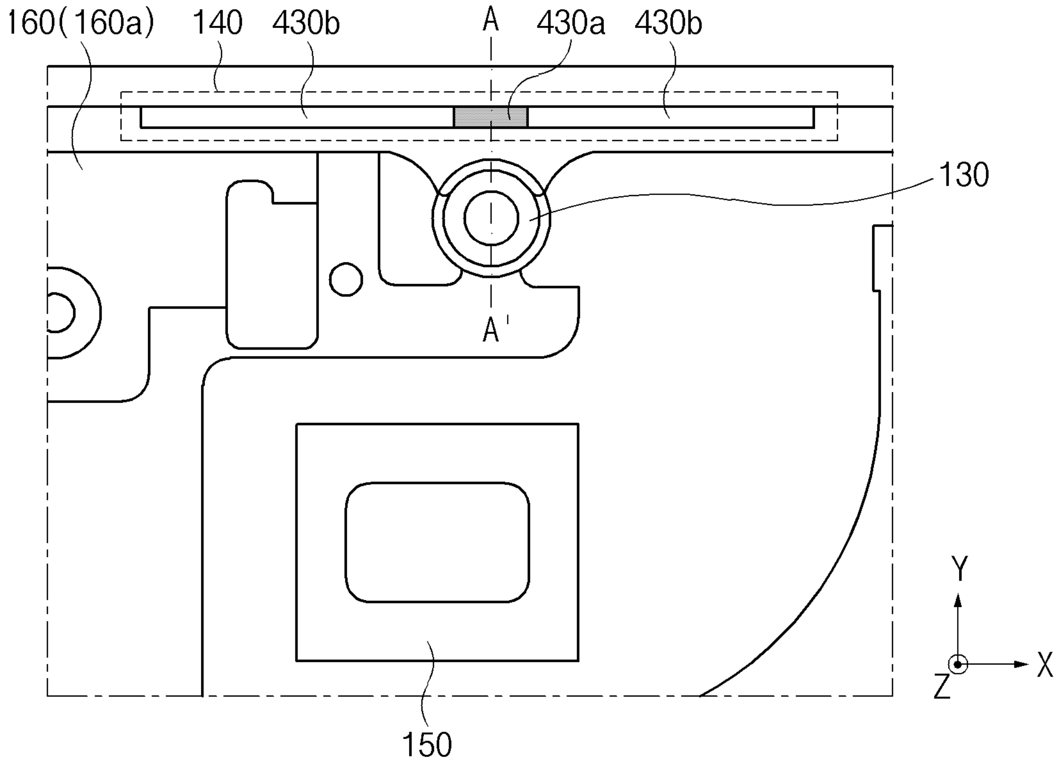
FIG. 10 shows the third conduit according to an embodiment of the disclosure.

FIG. 10 shows the third conduit according to an embodiment of the disclosure.

Referring to FIGS. 3, 4, and 10, the third conduit 430 may be formed inside the bracket 160. The sound inlet (not illustrated) of the third conduit 430 may be connected to the sound outlet 422 of the sound conduit element 4201.

The sound emission hole 430*a* of the third conduit 430 may be formed in the first surface 160*a* of the bracket 160.

The sound emitted through the sound emission hole 430*a* may be emitted to the outside of the electronic device 101 through the sound output opening 140. The sound emission hole 430*a* may be disposed between the side member 118 and the camera module 130. The region 430*b* that spreads sound throughout the sound output opening 140 may be disposed around the sound emission hole 430*a*.

According to an embodiment of the disclosure, the center of the sound emission hole 430*a* and the center of the lens of the camera module 130 may be disposed to be aligned with a virtual center line A-A' in a vertical direction of the electronic device 101. In this way, the sound generated from the sound element 150 is transmitted over a relatively short distance, so that the sound may not be deflected to the left or right and the loss of the sound may be small.

Figure 11:
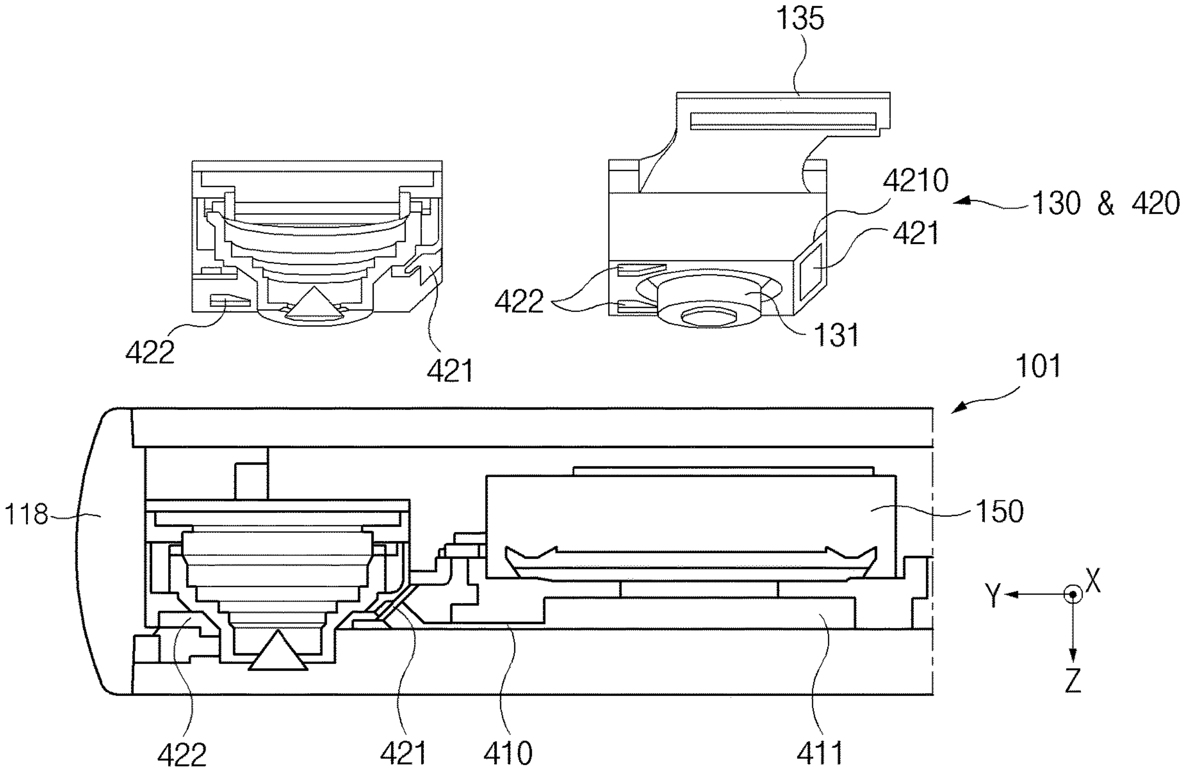
FIG. 11 shows an arrangement of the camera module and the sound conduit element according to an embodiment of the disclosure.

FIG. 11 shows an arrangement of the camera module and the sound conduit element according to an embodiment of the disclosure.

Referring to FIG. 11, the electronic device 101 may include the camera module 130, the sound conduit element 4201, the sound element 150, the side member 118, and the bracket 160. The side member 118, the camera module 130 (and the sound conduit element 4201, and the sound element 150 may be sequentially arranged in a y-direction.

The first conduit 410 may spatially connect a space 411 around the sound output surface and the sound inlet 421 of the sound conduit element 4201. A portion of the sound conduit element 4201 connected to the first conduit 410 may be formed with an inclined surface 4210. The sound inlet 421 may be disposed on the inclined surface 4210. When the sound conduit element 4201 includes the inclined surface 4210, the sound conduit element 4201 and the first conduit 410 may be easily coupled, and thus, which makes it possible to secure mountability.

Figure 12:
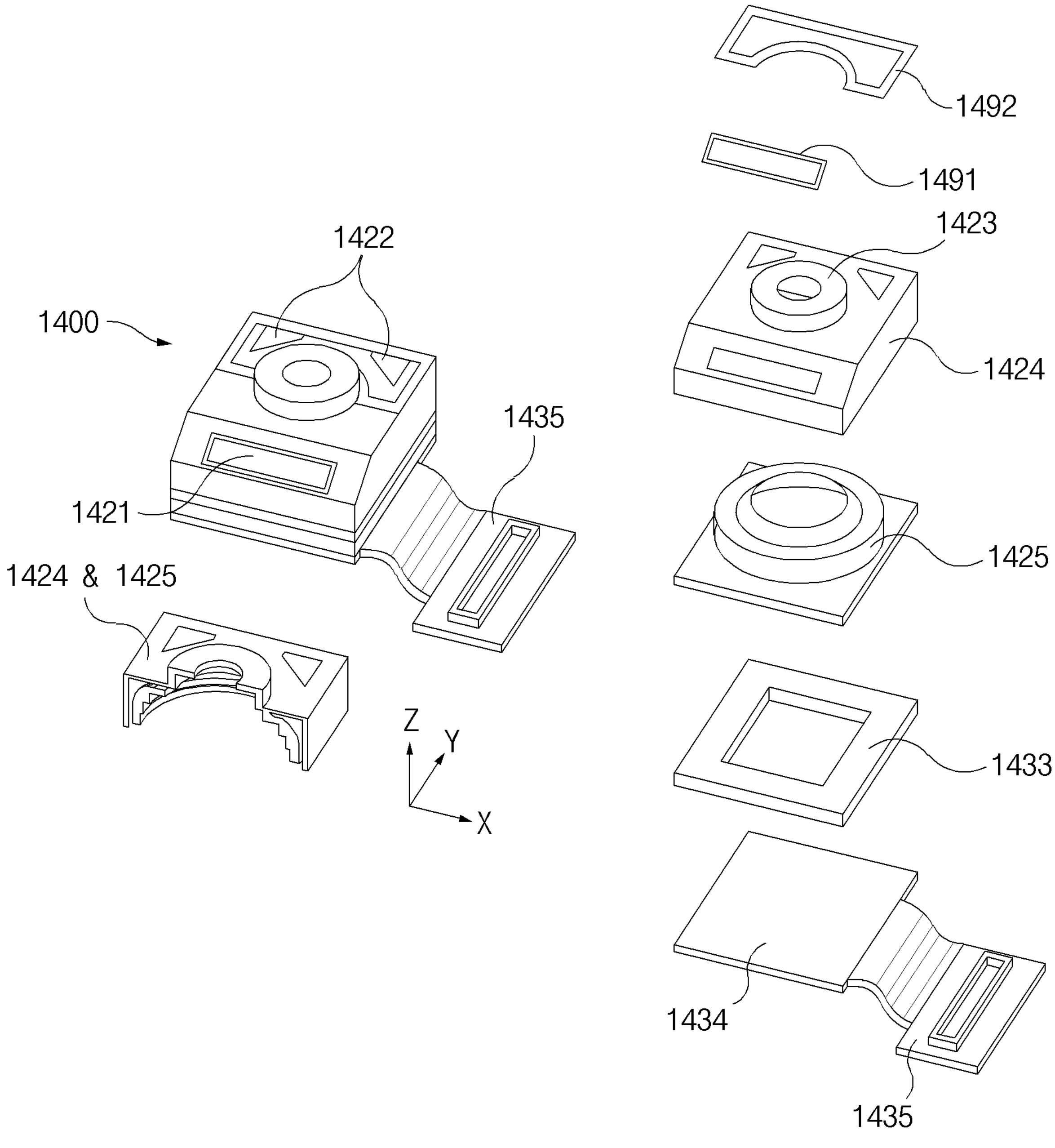
FIG. 12 shows a camera module in which the second conduit is formed according to an embodiment of the disclosure.

FIG. 12 shows a camera module in which the second conduit is formed according to an embodiment of the disclosure.

Referring to FIGS. 3, 4, and 12, a camera module 1400 may be implemented in a form in which a separate sound conduit element is not coupled and the barrel includes a second conduit. The camera module 1400 may include a first barrel (or a first camera housing) 1424, a second barrel (or a second camera housing) 1425, a camera bracket 1433, an image sensor 1434, a connector 1435, a first sealing member 1491, and a second sealing member 1492.

The second barrel 1425 may be coupled to a lower portion of the first barrel 1424. The first barrel 1424 may include a lens fixing portion 1423 for fixing the lenses at its center. In addition, the first barrel 1424 may include a sound inlet 1421 and a sound outlet 1422.

The sound inlet 1421 may be connected to the first conduit 410. The sound inlet 1421 may be formed on a side surface of the camera module 1400 (a side surface facing the first conduit 410). The first sealing member 1491 may block the sound inlet 1421 from the surroundings. The first sealing member 1491 may prevent or reduce inflow of foreign substances.

The sound outlet 1422 may be connected to the third conduit 430. The sound outlet 1422 may be formed on a front surface of the camera module 1400 (a surface that the lens faces). The second sealing member 1492 may block the sound outlet 1422 from the surroundings. The second sealing member 1492 may prevent or reduce inflow of foreign substances.

The second barrel 1425 may fix the lenses. The second barrel 1425 may be coupled to a lower portion of the first barrel 1424. The second barrel 1425 may have a shape corresponding to the arrangement of the lenses for fixing the lenses.

Figure 13:
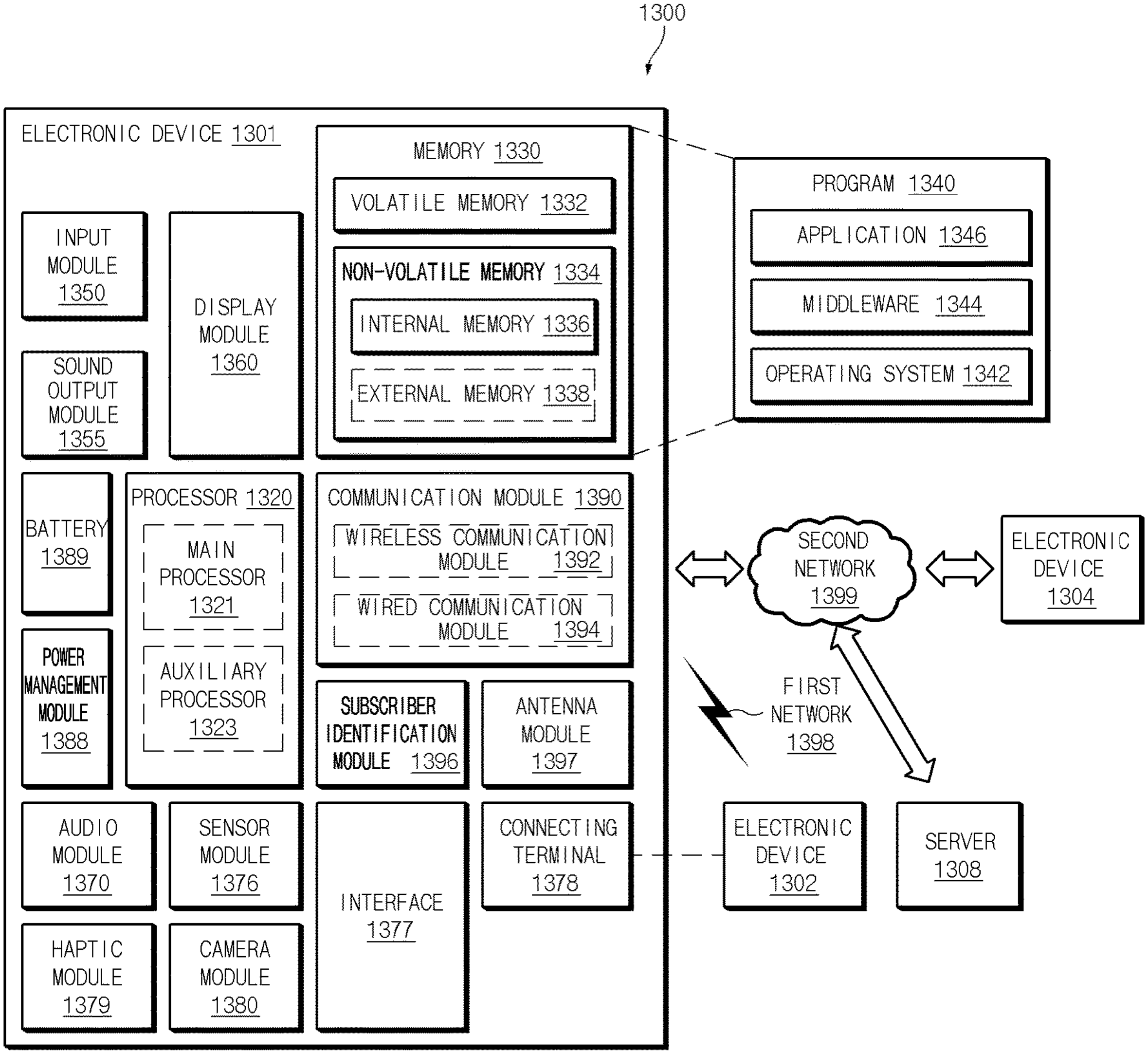
FIG. 13 is a block diagram illustrating an electronic device in a network environment according to an embodiment of the disclosure.

FIG. 13 is a block diagram illustrating an electronic device 1301 in a network environment 1300 according to an embodiment of the disclosure.

Referring to FIG. 13, the electronic device 1301 in the network environment 1300 may communicate with an external electronic device 1302 via a first network 1398 (e.g., a short-range wireless communication network), or at least one of an external electronic device 1304 or a server 1308 via a second network 1399 (e.g., a long-range wireless communication network). According to an embodiment of the disclosure, the electronic device 1301 may communicate with the external electronic device 1304 via the server 1308. According to an embodiment of the disclosure, the electronic device 1301 may include a processor 1320, memory 1330, an input module 1350, a sound output module 1355, a display module (or display) 1360, an audio module 1370, a sensor module 1376, an interface 1377, a connecting terminal 1378, a haptic module 1379, a camera module 1380, a power management module 1388, a battery 1389, a communication module 1390, a subscriber identification module (SIM) 1396, or an antenna module 1397. In some embodiments of the disclosure, at least one of the components (e.g., the connecting terminal 1378) may be omitted from the electronic device 1301, or one or more other components may be added in the electronic device 1301. In some embodiments of the disclosure, some of the components (e.g., the sensor module 1376, the camera module 1380, or the antenna module 1397) may be implemented as a single component (e.g., the display module 1360).

The processor 1320 may execute, for example, software (e.g., a program 1340) to control at least one other component (e.g., a hardware or software component) of the electronic device 1301 coupled with the processor 1320, and may perform various data processing or computation. According to an embodiment of the disclosure, as at least part of the data processing or computation, the processor 1320 may store a command or data received from another component (e.g., the sensor module 1376 or the communication module 1390) in volatile memory 1332, process the command or the data stored in the volatile memory 1332, and store resulting data in non-volatile memory 1334. According to an embodiment of the disclosure, the processor 1320 may include a main processor 1321 (e.g., a central processing unit (CPU) or an application processor (AP)), or an auxiliary processor 1323 (e.g., a graphics processing unit (GPU), a neural processing unit (NPU), an image signal processor (ISP), a sensor hub processor, or a communication processor (CP)) that is operable independently from, or in conjunction with, the main processor 1321. For example, when the electronic device 1301 includes the main processor 1321 and the auxiliary processor 1323, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display module 1360, the sensor module 1376, or the communication module 1390) among the components of the electronic device 1301, instead of the main processor 1321 while the main processor 1321 is in an inactive (e.g., a sleep) state, or together with the main processor 1321 while the main processor 1321 is in an active state (e.g., executing an application). According to an embodiment of the disclosure, the auxiliary processor 1323 (e.g., an image signal processor or a communication processor) may be implemented as part of another component (e.g., the camera module 1380 or the communication module 1390) functionally related to the auxiliary processor 1323. According to an embodiment of the disclosure, the auxiliary processor 1323 (e.g., the neural processing unit) may include a hardware structure specified for artificial intelligence model processing. An artificial intelligence model may be generated by machine learning. Such learning may be performed, e.g., by the electronic device 1301 where the artificial intelligence is performed or via a separate server (e.g., the server 1308). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input module 1350 may receive a command or data to be used by another component (e.g., the processor 1320) of the electronic device 1301, from the outside (e.g., a user) of the electronic device 1301. The input module 1350 may include, for example, a microphone, a mouse, a keyboard, a key (e.g., a button), or a digital pen (e.g., a stylus pen).

The sound output module 1355 may output sound signals to the outside of the electronic device 1301. The sound output module 1355 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 1360 may visually provide information to the outside (e.g., a user) of the electronic device 1301. The display module 1360 may include, for example, a display, a hologram device, or a projector and control circuitry to control a corresponding one of the display, hologram device, and projector. According to an embodiment of the disclosure, the display module 1360 may include a touch sensor adapted to detect a touch, or a pressure sensor adapted to measure the intensity of force incurred by the touch.

The audio module 1370 may convert a sound into an electrical signal and vice versa. According to an embodiment of the disclosure, the audio module 1370 may obtain the sound via the input module 1350, or output the sound via the sound output module 1355 or an external electronic device (e.g., the external electronic device 1302) (e.g., a speaker or a headphone) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment of the disclosure, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the external electronic device 1302) directly (e.g., wiredly) or wirelessly. According to an embodiment of the disclosure, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the external electronic device 1302). According to an embodiment of the disclosure, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1379 may include, for example, a motor, a piezoelectric element, or an electric stimulator.

The camera module 1380 may capture a still image or moving images. According to an embodiment of the disclosure, the camera module 1380 may include one or more lenses, image sensors, image signal processors, or flashes.

The power management module 1388 may manage power supplied to the electronic device 1301. According to an embodiment of the disclosure, the power management module 1388 may be implemented as at least part of, for example, a power management integrated circuit (PMIC).

The battery 1389 may supply power to at least one component of the electronic device 1301. According to an embodiment of the disclosure, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the external electronic device 1302, the external electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment of the disclosure, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The wireless communication module 1392 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1392 may support a high-frequency band (e.g., the mmWave band) to achieve, e.g., a high data transmission rate. The wireless communication module 1392 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1392 may support various requirements specified in the electronic device 1301, an external electronic device (e.g., the external electronic device 1304), or a network system (e.g., the second network 1399). According to an embodiment of the disclosure, the wireless communication module 1392 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1397 may transmit or receive a signal or power to or from the outside (e.g., the external electronic device) of the electronic device 1301. According to an embodiment of the disclosure, the antenna module 1397 may include an antenna including a radiating element including a conductive material or a conductive pattern formed in or on a substrate (e.g., a printed circuit board (PCB)). According to an embodiment of the disclosure, the antenna module 1397 may include a plurality of antennas (e.g., array antennas). In such a case, at least one antenna appropriate for a communication scheme used in the communication network, such as the first network 1398 or the second network 1399, may be selected, for example, by the communication module 1390 (e.g., the wireless communication module 1392) from the plurality of antennas. The signal or the power may then be transmitted or received between the communication module 1390 and the external electronic device via the selected at least one antenna. According to an embodiment of the disclosure, another component (e.g., a radio frequency integrated circuit (RFIC)) other than the radiating element may be additionally formed as part of the antenna module 1397.

According to various embodiments of the disclosure, the antenna module 1397 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1301 and the external electronic device 1304 via the server 1308 coupled with the second network 1399. Each of the external electronic devices 1302 or 1304 may be a device of a same type as, or a different type, from the electronic device 1301. According to an embodiment of the disclosure, all or some of operations to be executed at the electronic device 1301 may be executed at one or more of the external electronic devices 1302 or 1304, or the server 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1301. The electronic device 1301 may provide the outcome, with or without further processing of the outcome, as at least part of a reply to the request. To that end, a cloud computing, distributed computing, mobile edge computing (MEC), or client-server computing technology may be used, for example. The electronic device 1301 may provide ultra low-latency services using, e.g., distributed computing or mobile edge computing. In another embodiment of the disclosure, the external electronic device 1304 may include an Internet-of-things (IoT) device. The server 1308 may be an intelligent server using machine learning and/or a neural network. According to an embodiment of the disclosure, the external electronic device 1304 or the server 1308 may be included in the second network 1399. The electronic device 1301 may be applied to intelligent services (e.g., smart home, smart city, smart car, or healthcare) based on 5G communication technology or IoT-related technology.

In the electronic device, when the front camera module is disposed between the receiver for calls and the opening for sound emission, the conduit for connecting the receiver and the opening is disposed to bypass the front camera module. In this case, the sound emission hole is disposed biased to the left or right rather than the center of the upper portion of the electronic device, which may cause inconvenience to the user due to left and right volume deviation and volume loss.

In the electronic device according to embodiments disclosed herein, when the camera module is disposed between the sound device for calls and the opening for emitting sound, an electronic device including the sound conduit that does not bypass the camera module may be provided.

The electronic device 101 or 1301 according to an embodiment may include the display 125 or the display 1360, the housing 110 including the sound output opening 140 for sound output, the camera module 130 or 1380 including an image sensor, at least one lens, and a barrel for fixing the at least one lens, the sound conduit element 4201 surrounding at least a portion of the barrel and including the sound inlet 421 and the sound outlet 422, the sound element 150 or 1370 outputting sound through the sound conduit element and the opening, and the bracket 160 on which the camera module 130 or 1380 and the sound element 150 or 1370 are mounted. The bracket 160 may include the first conduit 410 that spatially connects the sound output surface of the sound element 150 or 1370 and the sound inlet 421. The sound conduit element 4201 may include the second conduit 420 that spatially connects the sound inlet 421 and the sound outlet 422. The bracket 160 may include the third conduit 430 that spatially connects the sound outlet 422 and the sound output opening 140 of the housing 110.

According to an embodiment of the disclosure, the sound conduit element 4201 may include a through-hole through which the barrel passes.

According to an embodiment of the disclosure, the sound conduit element 4201 may be coupled to the camera module 130 or 1680 to be disposed between the bracket 160 and the camera module 130 or 1380.

According to an embodiment of the disclosure, the sound outlet 422 may be spatially connected to an inlet of the third conduit 430.

According to an embodiment of the disclosure, the sound outlet 422 may include a first sound outlet and a second sound outlet that are separated from each other.

According to an embodiment of the disclosure, the sound inlet 421 may be spatially connected to an outlet of the first conduit 410.

According to an embodiment of the disclosure, the sound conduit element 4201 may include an inclined surface at a portion connected to the first conduit 410. The sound inlet 421 may be formed on the inclined surface.

According to an embodiment of the disclosure, the first conduit 410 may be formed through the bracket 160 and a separate plate coupled to the bracket 160.

According to an embodiment of the disclosure, the camera module 130 or 1380 and the sound element 150 or 1370 may be coupled to one surface of the bracket 160.

According to an embodiment of the disclosure, the first conduit 410 may be formed on another surface of the bracket 160.

According to an embodiment of the disclosure, the at least one lens of the camera module 130 or 1380 may be exposed through a hole formed in the display 125 or the display 1360.

According to an embodiment of the disclosure, the sound element 150 or 1370 may be a receiver for voice calls.

According to an embodiment of the disclosure, the center of the sound output opening 140, the center of the at least one lens, and the center of the third conduit 430 may be aligned in a line.

According to an embodiment of the disclosure, the third conduit 430 may be formed inside the bracket 160.

The electronic device 101 or 1301 according to an embodiment of the disclosure may include the display 125 or the display 1360, the housing 110 including the sound output opening 140 for sound output, the camera module 1400 or 1380 including an image sensor, at least one lens and a barrel for fixing the at least one lens, the sound element 150 or 1370 configured to output sound, and the bracket 160 on which the camera module 1400 or 1380 and the sound element 150 or 1370 are mounted. The bracket 160 may include the first conduit 410 that is spatially connected to the sound output surface of the sound element 150 or 1370. The camera module 1400 or 1380 may include the second conduit 420 surrounding at least a portion of the barrel and including the sound inlet 1421 and the sound outlet 1422. The first conduit 410 may be spatially connected to the sound inlet 1421. The bracket 160 may include the third conduit 430 that spatially connects the sound outlet 1422 and the sound output opening 140 of the housing 110.

According to an embodiment of the disclosure, the sound outlet 1422 may be spatially connected to the inlet of the third conduit 430.

According to an embodiment of the disclosure, the sound outlet 1422 may include the first sound outlet and the second sound outlet that are separated from each other.

According to an embodiment of the disclosure, the sound inlet 1421 may be spatially connected to the outlet of the first conduit 410.

According to an embodiment of the disclosure, the first conduit 410 may be formed through the bracket 160 and a separate plate coupled to the bracket 160.

According to an embodiment of the disclosure, the camera module 1400 or 1380 and the sound element 150 or 1370 may be coupled to one surface of the bracket 160. The first conduit 410 may be formed on another surface of the bracket 160.

According to an embodiment of the disclosure, the center of the sound output opening 140, the center of the at least one lens, and the center of the third conduit 430 may be aligned in a line.

The electronic device according to embodiments of the disclosure disclosed herein may use a sound conduit surrounding the lens section or barrel of the camera module, thereby preventing sound from being deflected to the left or right and reducing sound loss.

It should be appreciated that various embodiments of the disclosure and the terms used therein are not intended to limit the technological features set forth herein to particular embodiments and include various changes, equivalents, or replacements for a corresponding embodiment. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, and may interchangeably be used with other terms, for example, “logic,” “logic block,” “part,” or “circuitry”. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory, such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a display;

a housing including an opening for sound output;

a camera module including an image sensor, at least one lens, and a barrel for fixing the at least one lens;

a sound conduit element surrounding at least a portion of the barrel and including a sound inlet and a sound outlet;

a sound element outputting sound through the sound conduit element and the opening; and a bracket on which the camera module and the sound element are mounted, wherein the bracket includes a first conduit that spatially connects a sound output surface of the sound element and the sound inlet, wherein the sound conduit element includes a second conduit that spatially connects the sound inlet and the sound outlet, and wherein the bracket includes a third conduit that spatially connects the sound outlet and the opening of the housing.

2. The electronic device of claim 1, wherein the sound conduit element includes a through-hole through which the barrel passes.

3. The electronic device of claim 1, wherein the sound conduit element is coupled to the camera module to be disposed between the bracket and the camera module.

4. The electronic device of claim 1, wherein the sound outlet is spatially connected to an inlet of the third conduit.

5. The electronic device of claim 1, wherein the sound outlet includes a first sound outlet and a second sound outlet that are separated from each other.

6. The electronic device of claim 1, wherein the sound inlet is spatially connected to an outlet of the first conduit.

7. The electronic device of claim 1, wherein the sound conduit element includes an inclined surface at a portion connected to the first conduit, and wherein the sound inlet is formed on the inclined surface.

8. The electronic device of claim 1, wherein the first conduit is formed through the bracket and a separate plate coupled to the bracket.

9. The electronic device of claim 1, wherein the camera module and the sound element are coupled to one surface of the bracket, and wherein the first conduit is formed on another surface of the bracket.

10. The electronic device of claim 1, wherein the at least one lens of the camera module is exposed through a hole formed in the display.

11. The electronic device of claim 1, wherein the sound element is a receiver for voice calls.

12. The electronic device of claim 1, wherein a center of the opening, a center of the at least one lens, and a center of the third conduit are aligned in a line.

13. The electronic device of claim 1, wherein the third conduit is formed inside the bracket.

14. An electronic device comprising:

a display;

a housing including an opening for sound output;

a camera module including an image sensor, at least one lens, and a barrel for fixing the at least one lens;

a sound element configured to output sound; and a bracket on which the camera module and the sound element are mounted, wherein the bracket includes a first conduit that is spatially connected to a sound output surface of the sound element, wherein the camera module includes a second conduit surrounding at least a portion of the barrel and including a sound inlet and a sound outlet, wherein the first conduit is spatially connected to the sound inlet, and wherein the bracket includes a third conduit that spatially connects the sound outlet and the opening of the housing.

15. The electronic device of claim 14, wherein the sound outlet is spatially connected to an inlet of the third conduit.

16. The electronic device of claim 14, wherein the sound outlet includes a first sound outlet and a second sound outlet that are separated from each other.

17. The electronic device of claim 14, wherein the sound inlet is spatially connected to an outlet of the first conduit.

18. The electronic device of claim 14, wherein the first conduit is formed through the bracket and a separate plate coupled to the bracket.

19. The electronic device of claim 14, wherein the camera module and the sound element are coupled to one surface of the bracket, and wherein the first conduit is formed on another surface of the bracket.

20. The electronic device of claim 14, wherein a center of the opening, a center of the at least one lens, and a center of the third conduit are aligned in a line.

* * * * *